US010878684B1

(12) United States Patent
Eller

(10) Patent No.: US 10,878,684 B1
(45) Date of Patent: Dec. 29, 2020

(54) SWIMMING POOL SAFETY DEVICE

(71) Applicant: Phillip Eller, Rock Hill, SC (US)

(72) Inventor: Phillip Eller, Rock Hill, SC (US)

( * ) Notice: Subject to any disclaimer, the term of this patent is extended or adjusted under 35 U.S.C. 154(b) by 0 days.

(21) Appl. No.: 16/680,589

(22) Filed: Nov. 12, 2019

(51) Int. Cl.
| G08B 21/08 | (2006.01) |
| G08B 7/06 | (2006.01) |
| E04H 4/06 | (2006.01) |
| G08B 25/10 | (2006.01) |
| H04W 84/12 | (2009.01) |

(52) U.S. Cl.
CPC ............. *G08B 21/084* (2013.01); *E04H 4/06* (2013.01); *G01K 1/024* (2013.01); *G08B 7/06* (2013.01); *G08B 25/10* (2013.01); *H04W 84/12* (2013.01)

(58) Field of Classification Search
CPC ...................................................... G08B 21/08
See application file for complete search history.

(56) References Cited

U.S. PATENT DOCUMENTS

| D516,445 | S | 3/2006 | DiPasquale | |
| 7,019,649 | B2 | 3/2006 | Hoenig | |
| 7,026,926 | B1* | 4/2006 | Walker, III | G08B 27/00 340/506 |
| 7,218,235 | B1 | 5/2007 | Rainey | |
| 7,427,923 | B2 | 9/2008 | Durand | |
| 9,640,058 | B1 | 5/2017 | Bollman | |
| 10,198,929 | B2 | 2/2019 | Snyder | |
| 2005/0194296 | A1* | 9/2005 | Lin | C02F 1/76 210/85 |
| 2007/0205908 | A1* | 9/2007 | Du | G08B 5/36 340/636.1 |
| 2008/0258907 | A1 | 10/2008 | Kalpaxis | |
| 2016/0155314 | A1* | 6/2016 | Snyder | G08B 21/088 340/573.6 |
| 2017/0314282 | A1* | 11/2017 | Nix | E04H 4/1245 |

FOREIGN PATENT DOCUMENTS

WO      2015006551      1/2015

* cited by examiner

*Primary Examiner* — Nabil H Syed
*Assistant Examiner* — Cal J Eustaquio

(57) ABSTRACT

The swimming pool safety device comprises a circuit board, one or more motion sensors, a wireless transceiver, a cover, and one or more batteries. The swimming pool safety device may monitor a swimming pool for motion. In the event that motion is detected, the swimming pool safety device may transmit an alert message to a remote monitoring point to warn of a potential drowning. As non-limiting examples, the remote monitoring point may be a smart device, a home security system, or both. In some embodiments, the swimming pool safety device may comprise a temperature sensor and may be able to transmit the temperature of the water to the remoting monitoring point. The swimming pool safety device may be left free-floating in the water or may be coupled to the pool using a wall attachment.

15 Claims, 4 Drawing Sheets

SWIMMING POOL SAFETY DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of swimming pool equipment, more specifically, a swimming pool safety device.

SUMMARY OF INVENTION

The swimming pool safety device comprises a circuit board, one or more motion sensors, a wireless transceiver, a cover, and one or more batteries. The swimming pool safety device may monitor a swimming pool for motion. In the event that motion is detected, the swimming pool safety device may transmit an alert message to a remote monitoring point to warn of a potential drowning. As non-limiting examples, the remote monitoring point may be a smart device, a home security system, or both. In some embodiments, the swimming pool safety device may comprise a temperature sensor and may be able to transmit the temperature of the water to the remoting monitoring point. The swimming pool safety device may be left free-floating in the water or may be coupled to the pool using a wall attachment.

An object of the invention is to detect motion in a swimming pool that may indicate a drowning event.

Another object of the invention is to transmit an alert message to a remote monitoring point when motion s detected.

A further object of the invention is to be provide an option for the swimming pool safety device to be free-floating in the water or coupled to the swimming pool.

Yet another object of the invention is to monitor the temperature of the water.

These together with additional objects, features and advantages of the swimming pool safety device will be readily apparent to those of ordinary skill in the art upon reading the following detailed description of the presently preferred, but nonetheless illustrative, embodiments when taken in conjunction with the accompanying drawings.

In this respect, before explaining the current embodiments of the swimming pool safety device in detail, it is to be understood that the swimming pool safety device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the swimming pool safety device.

It is therefore important that the claims be regarded as including such equivalent construction insofar as they do not depart from the spirit and scope of the swimming pool safety device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
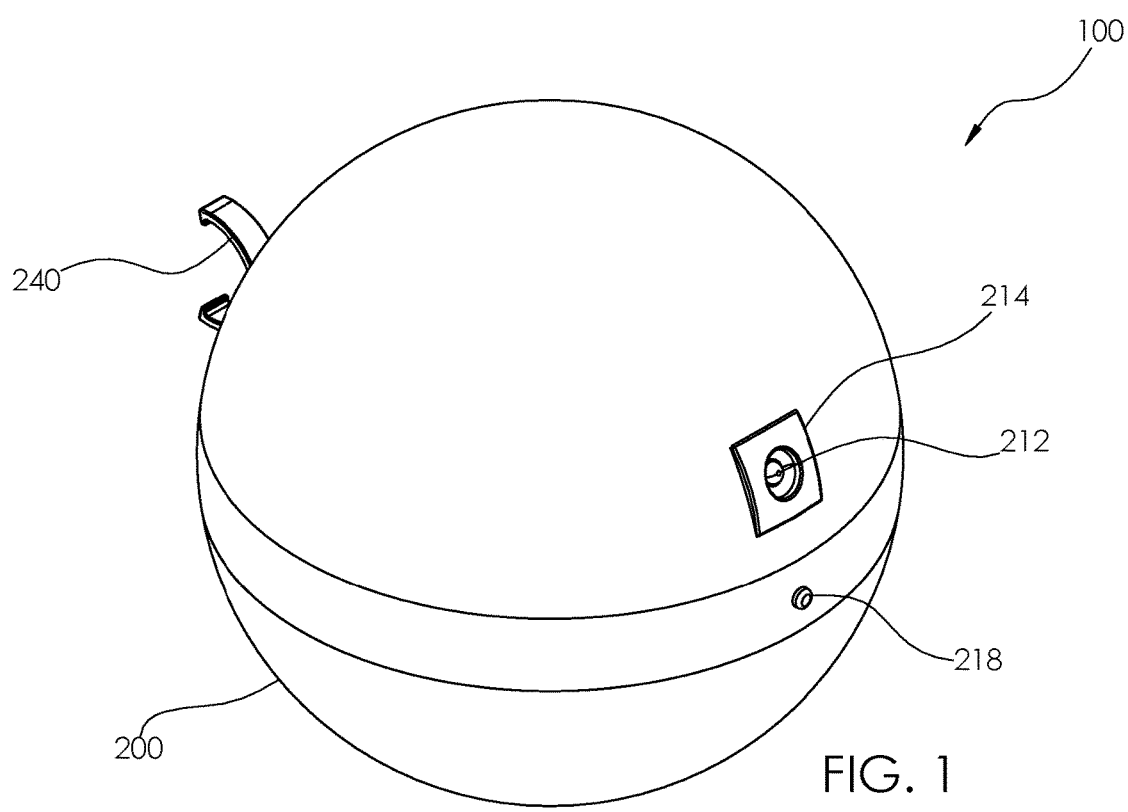
FIG. 1 is an isometric view of an embodiment of the disclosure.
Figure 2:
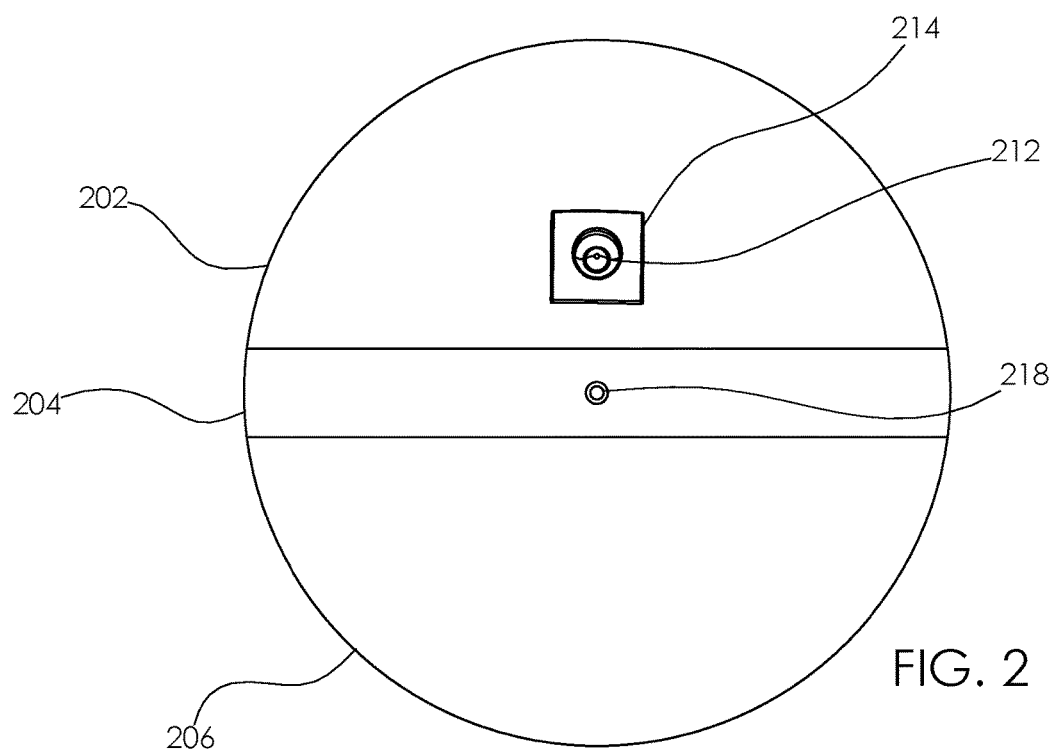
FIG. 2 is a front view of an embodiment of the disclosure.
Figure 3:
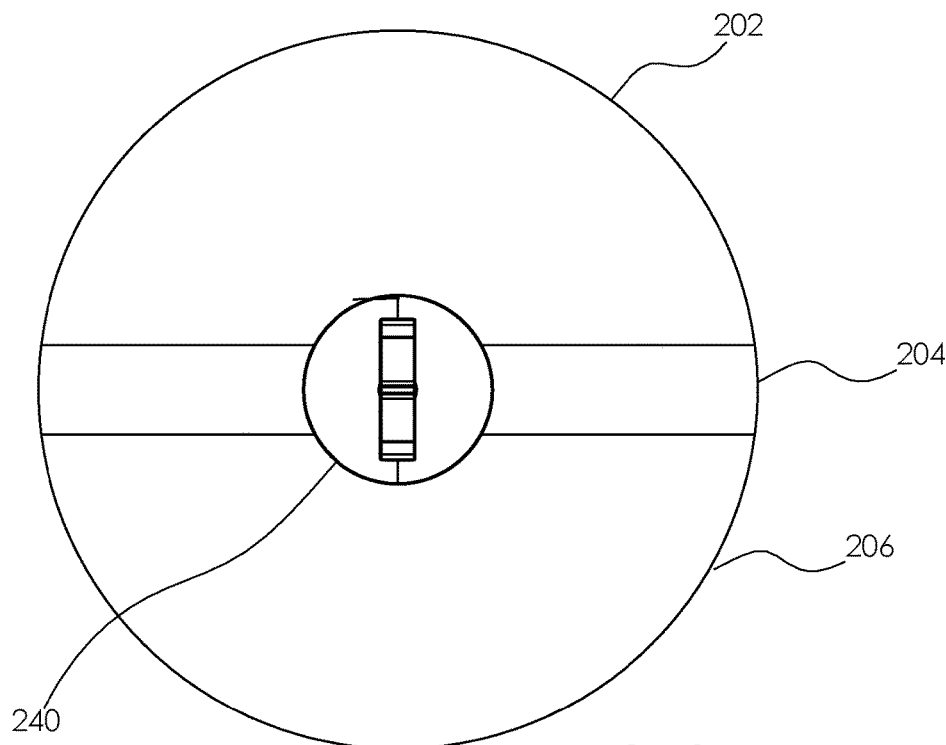
FIG. 3 is a rear view of an embodiment of the disclosure.
Figure 4:
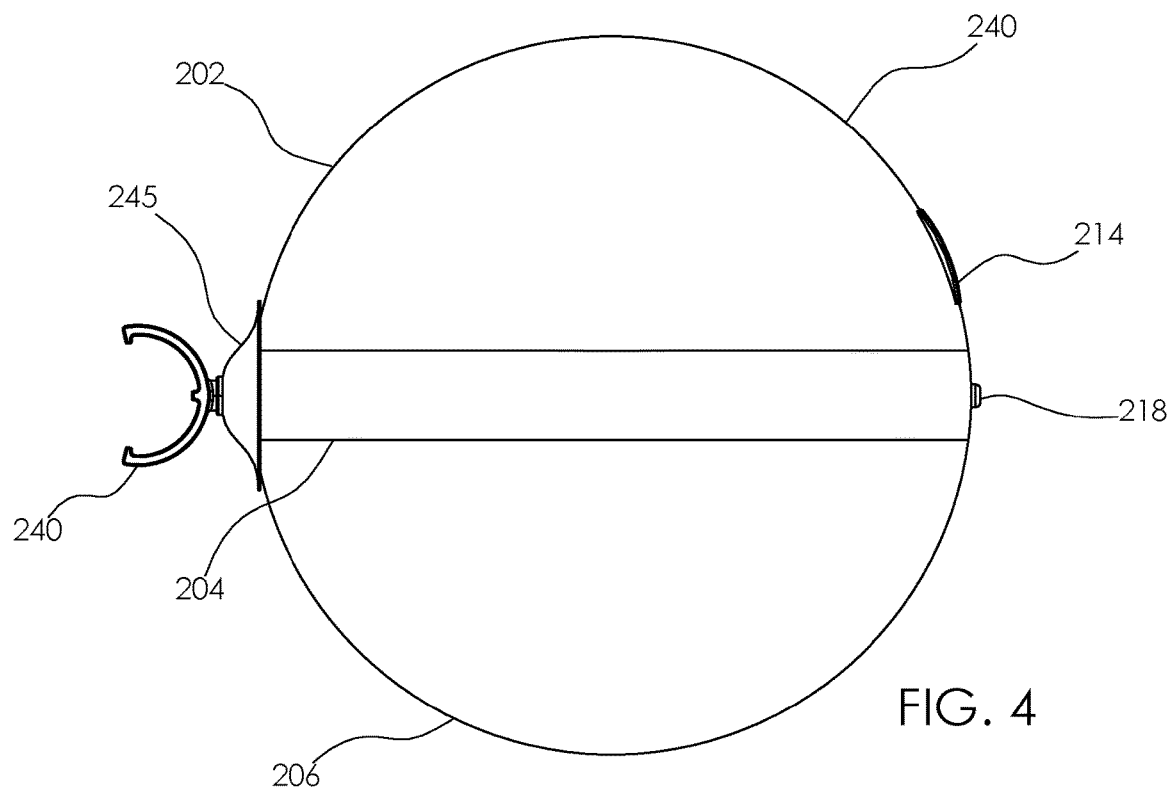
FIG. 4 is a side view of an embodiment of the disclosure.
Figure 5:
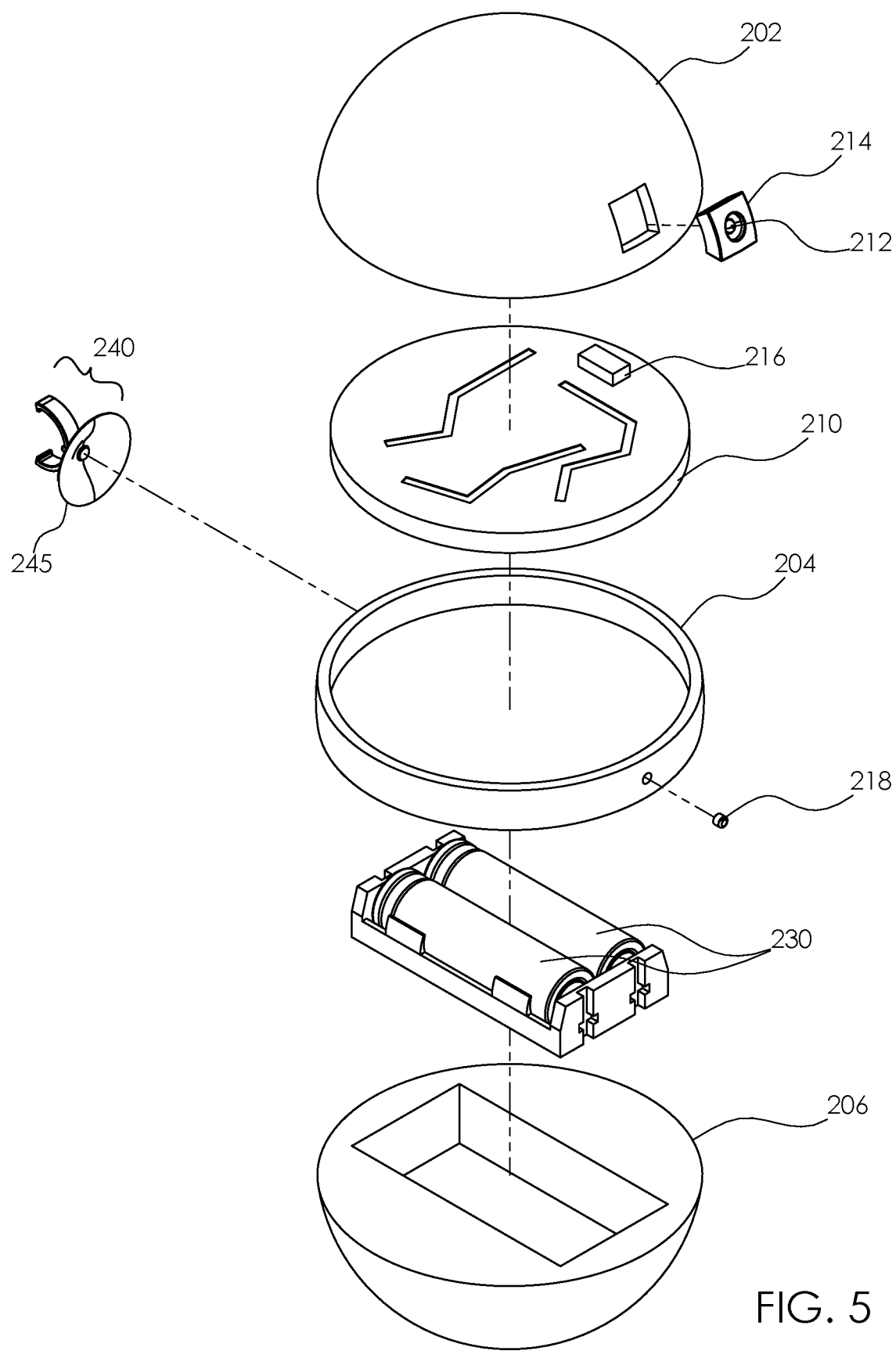
FIG. 5 is an exploded view of an embodiment of the disclosure.
Figure 6:
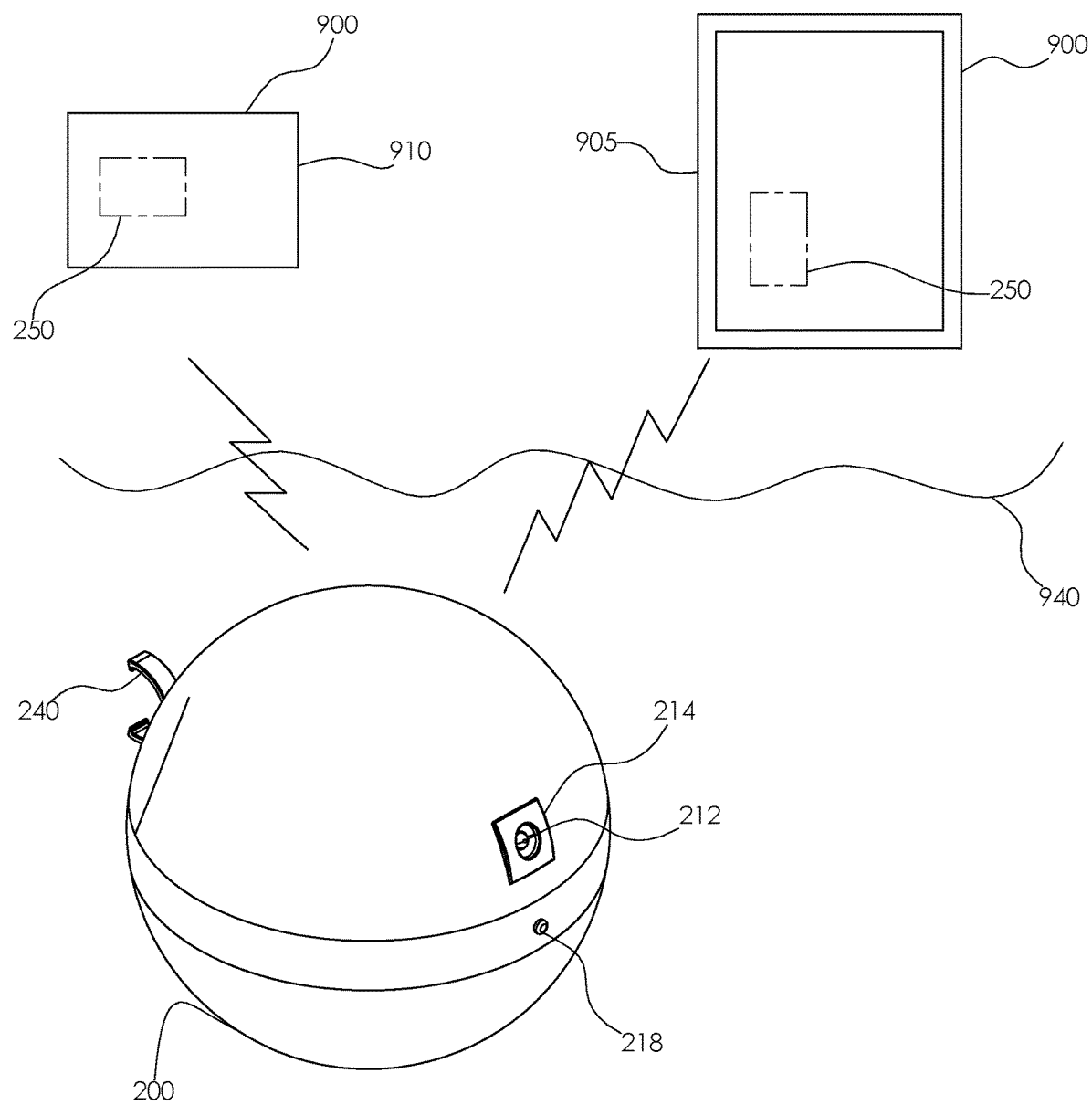
FIG. 6 is an in-use view of an embodiment of the disclosure.

Detailed reference will now be made to a first potential embodiment of the disclosure, which is illustrated in FIGS. 1 through 6.

The swimming pool safety device 100 (hereinafter invention) comprises a circuit board 210, one or more motion sensors 212, a wireless transceiver 216, a cover 200, and one or more batteries 230. The invention 100 may monitor a swimming pool for motion. In the event that motion is detected, the invention 100 may transmit an alert message to warn of a potential drowning.

The circuit board 210 may control the operation of the invention 100. The circuit board 210 may be electrically coupled to the one or more motion sensors 212 and the one or more batteries 230. The circuit board 210 may be operable to determine, via the one or more motion sensors 212, that a drowning may be in progress. Responsive to detected motion, the circuit board 210 may be operable to transmit the alert message, via the wireless transceiver 216, to a remote monitoring point 900. The remote monitoring point 900 may be a smart device 905. As non-limiting example, the smart device 905 may be a smart phone, tablet computer, or laptop computer. In some embodiments, the remote monitoring point 900 may be a home security system 910.

The one or more motion sensors 212 may be operable to sense movement and to produce a sensor output signal indicative of the movement. The one or more motion sensors 212 may be electrically coupled to the circuit board 210 such that the circuit board 210 may determine the state of the sensor output signal. The one or more motion sensors 212 may sense movement of water 940 relative to the cover 200. As non-limiting examples, the one or more motion sensors 212 may be an acceleration sensor, a velocity sensor, a pressure sensor, a tilt sensor, a vibration sensor, or combinations thereof.

The wireless transceiver 216 may be operable to transfer messages, status, and commands bidirectionally between the circuit board 210 and the remote monitoring point 900. As a non-limiting example, the wireless transceiver 216 may transfer messages using WiFi radio frequencies and protocols. As a non-limiting example, the WiFi protocols may be those defined by defined by the IEEE 802.11 standards.

The cover 200 may be an enclosure for the one or more motion sensors 212, the circuit board 210, and the one or more batteries 230. The cover 200 may comprise a sensor compartment 202, a circuit board compartment 204, and a battery compartment 206. The cover 200 may be watertight such that the invention 100 floats in the water 940. In some embodiments, the cover 200 may be spherical. The cover 200 may be separable at the boundaries between sections. Specifically, the cover 200 may be separable at the boundary between the sensor compartment 202 and the circuit board compartment 204, at the boundary between the circuit board compartment 204 and the battery compartment 206, or both. The sensor compartment 202 may house the one or more motion sensors 212. The circuit board compartment 204 may house the circuit board 210. The battery compartment 206 may house the one or more batteries 230.

The one or more batteries 230 may comprise one or more energy-storage devices. The one or more batteries 230 may be a source of electrical energy to operate the circuit board 210. The one or more batteries 230 may be replaceable or rechargeable.

A power indicator 218 may be mounted on the cover 200 where the power indicator 218 is visible. The power indicator 218 may be electrically coupled to the circuit board 210. The power indicator 218 may be a visual indication of the power state of the invention 100. The power indicator 218 may report the power state of the invention 100 using an on/off state, brightness, blink rate, and combinations thereof. As a non-limiting example, the power indicator 218 may report that the invention 100 is powered and operational by turning on at full brightness and may report a low battery charge by blinking at 50% brightness.

The invention 100 may further comprise a temperature sensor 214. The temperature sensor 214 may determine the temperature of the water 940. The temperature sensor 214 may be electrically coupled to the circuit board 210. The circuit board 210 may transmit the temperature reading to the remote monitoring point 900.

The invention 100 may further comprise software 250 that may be executed on the remote monitoring point 900. Responsive to receiving the alert messages send from the circuit board 210, the software 250 may cause the remote monitoring point 900 to responsive to produce an audiovisual indication such that attention is drawn to the swimming pool. As non-limiting examples, the software 250 may show a message on the display of the smart device 905, may activate a sound transducer of the smart device 905 to play a recorded message or alert tones, may cause lighting available on the smart device 905 to flash, may activate alarms of the home security system 910, or combinations thereof. In some embodiments, the software 250 may cause the remote monitoring point 900 to forward the alert message to another system via a WiFi or telephone network. As a non-limiting example, the software 250 may dial 911 and play a recorded or synthesized voice message describing the situation and giving the location. The software 250 may be operable to establish an operating mode for the circuit board 210 by sending commands to the circuit board 210. As non-limiting examples, the software 250 may command the circuit board 210 to ignore motion when the swimming pool is expected to be in use.

The invention 100 may comprise a wall attachment 240 that is operable to attach the cover 200 to the swimming pool such that the cover 200 remains stationary. In some embodiments, the wall attachment 240 may couple to the cover 200 via a suction cup 245.

In use, the cover 200 is placed into the swimming pool. The cover 200 may be left free-floating in the water 940 or may be attached to the swimming pool using the wall attachment 240. Using the software 250 executing on the smart device 905, the circuit board 210 may be placed into an operating mode where motion will produce the alert message. If a child falls into the swimming pool, the one or more motion sensors 212 may produce the sensor output signal indicative of the motion. The circuit board 210 may read the sensor output signal and become aware of the motion. Responsive to detecting the motion, the circuit board 210 may transmit the alert message via the wireless transceiver 216. The alert message may be received by the remote monitoring point 900 which may take action to notify an adult of the presence of the child in the swimming pool.

During normal use of the swimming pool, the software 250 executing on the smart device 905 may be used to place the circuit board 210 into an operating mode where motion will be ignored.

Definitions

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", refer to connecting, either directly or indirectly, and does not necessarily imply a mechanical connection.

As used in this disclosure, the "IEEE" (pronounced "I triple E") is an acronym for the Institute for Electrical and Electronic Engineers. IEEE is a professional association. Among other things, IEEE develops global standards covering a wide range of industries.

As used in this disclosure, a "laptop computer" is a computer that incorporates into a single housing: 1) a mechanism to provide tactile inputs; 2) a mechanism to provide visual and audio outputs; 3) a mechanism to receive digital or analog inputs from an external mechanical device; and, 4) a mechanism to provide digital or analog outputs to an external mechanical device. The single housing is sized such that the laptop computer can be transported by a single person.

As used in this disclosure, a "network" refers to a data communication or data exchange structure where data is electronically transferred between nodes, also known as terminals, which are electrically attached to the network. In common usage, the operator of the network is often used as an adjective to describe the network. As a non-limiting example, a telecommunication network may refer to a network run by a telecommunication organization while a banking network may refer to a network operated by an organization involved in banking.

As used in this disclosure, a "sensor" is a device that quantitatively measures a physical stimulus.

As used herein, "smart device" refers to a portable electrical device comprising at least a processor, display, input device, and network connection. The input device is generally a touch screen, keyboard, or voice recognition. The network connection is generally wireless. Non-limiting examples of smart devices may include smartphones, tablets, personal digital assistants, laptop computers, and smartwatches.

As used in this disclosure, a "suction cup" refers to an object or device that uses negative fluid pressure of air or water to adhere to nonporous surfaces by creating a partial vacuum.

As used herein, a "tablet computer" or "tablet" refers to a mobile computing device packaged as a single, monolithic unit —similar in appearance to a paper tablet. Typically, tablet computers have a touch sensitive, flat video display covering most of the front surface and do not have a keyboard; although many tablet computers may be mated with a separate keyboard accessory. Tablet computers generally comprise one or more microprocessors, memory, and a rechargeable battery internal to the tablet. Most tablet computers comprise a wireless network connection, typically via a WiFi interface. Many tablet computers comprise an internal camera, microphone, and one or more audio speakers. Interaction between the user and a tablet computer is generally via the touch screen using a stylus or fingers and may involve the use of 'gestures' which are specific motions on the touch screen which are interpreted by the tablet computer to magnify or shrink the display, open, close, or switch between applications, scroll, or perform other tablet computer functions.

As used in this disclosure, a "transceiver" is a device that is used to transmit and/or receive signals. The signals may be audible, optical, or RF in nature.

As used in this disclosure, a "transducer" is a device that converts a physical quantity, such as pressure or brightness into an electrical signal or a device that converts an electrical signal into a physical quantity.

As used herein, the word "watertight" refers to a barrier that is impermeable to water.

As used in this disclosure, "WiFi" refers to the physical implementation of a collection of wireless electronic communication standards commonly referred to as IEEE 802.11x and used for wireless communication between devices.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A swimming pool safety device comprising:
a circuit board, one or more motion sensors, a wireless transceiver, a cover, and one or more batteries;
wherein the swimming pool safety device monitors a swimming pool for motion;
wherein in the event that motion is detected, the swimming pool safety device transmits an alert message to warn of a potential drowning;
wherein the circuit board controls the operation of the swimming pool safety device;
wherein the circuit board is electrically coupled to the one or more motion sensors and the one or more batteries;
wherein the circuit board is operable to determine, via the one or more motion sensors, that a drowning is in progress;
wherein responsive to detected motion, the circuit board is operable to transmit the alert message, via the wireless transceiver, to a remote monitoring point;
wherein a power indicator is mounted on the cover where the power indicator is visible;
wherein the power indicator is electrically coupled to the circuit board;
wherein the power indicator is a visual indication of the power state of the swimming pool safety device;
wherein the power indicator reports the power state of the swimming pool safety device using an on/off state, brightness, blink rate, and combinations thereof;
wherein the swimming pool safety device further comprises a temperature sensor;
wherein the temperature sensor determines the temperature of the water;
wherein the temperature sensor is electrically coupled to the circuit board;
wherein the circuit board transmits the temperature reading to the remote monitoring point;
wherein the swimming pool safety device further comprises software that is executed on the remote monitoring point;
wherein responsive to receiving the alert messages send from the circuit board, the software causes the remote monitoring point to responsive to produce an audiovisual indication such that attention is drawn to the swimming pool;
wherein the software commands the circuit board to ignore motion when the swimming pool is expected to be in use.

2. The swimming pool safety device according to claim 1 wherein the remote monitoring point is a smart device.

3. The swimming pool safety device according to claim 1 wherein the remote monitoring point is a home security system.

4. The swimming pool safety device according to claim 1
  wherein the one or more motion sensors are operable to sense movement and to produce a sensor output signal indicative of the movement;
  wherein the one or more motion sensors are electrically coupled to the circuit board such that the circuit board determines the state of the sensor output signal;
  wherein the one or more motion sensors sense movement of water relative to the cover.

5. The swimming pool safety device according to claim 4
  wherein the wireless transceiver is operable to transfer messages, status, and commands bidirectionally between the circuit board and the remote monitoring point.

6. The swimming pool safety device according to claim 5
  wherein the wireless transceiver transfers messages using WiFi radio frequencies and protocols.

7. The swimming pool safety device according to claim 5
  wherein the cover is an enclosure for the one or more motion sensors, the circuit board, and the one or more batteries;
  wherein the cover comprises a sensor compartment, a circuit board compartment, and a battery compartment.

8. The swimming pool safety device according to claim 7
  wherein the cover is watertight such that the swimming pool safety device floats in the water.

9. The swimming pool safety device according to claim 8
  wherein the cover is spherical.

10. The swimming pool safety device according to claim 8
  wherein the cover is separable at the boundaries between sections.

11. The swimming pool safety device according to claim 8
  wherein the sensor compartment houses the one or more motion sensors;
  wherein the circuit board compartment houses the circuit board;
  wherein the battery compartment houses the one or more batteries.

12. The swimming pool safety device according to claim 11
  wherein the one or more batteries comprise one or more energy-storage devices;
  wherein the one or more batteries are a source of electrical energy to operate the circuit board;
  wherein the one or more batteries are replaceable or rechargeable.

13. The swimming pool safety device according to claim 12
  wherein the software is operable to establish an operating mode for the circuit board by sending commands to the circuit board.

14. The swimming pool safety device according to claim 12
  wherein the swimming pool safety device comprises a wall attachment that is operable to attach the cover to the swimming pool such that the cover remains stationary.

15. The swimming pool safety device according to claim 14
  wherein the wall attachment couples to the cover via a suction cup.

* * * * *